Figure 1:
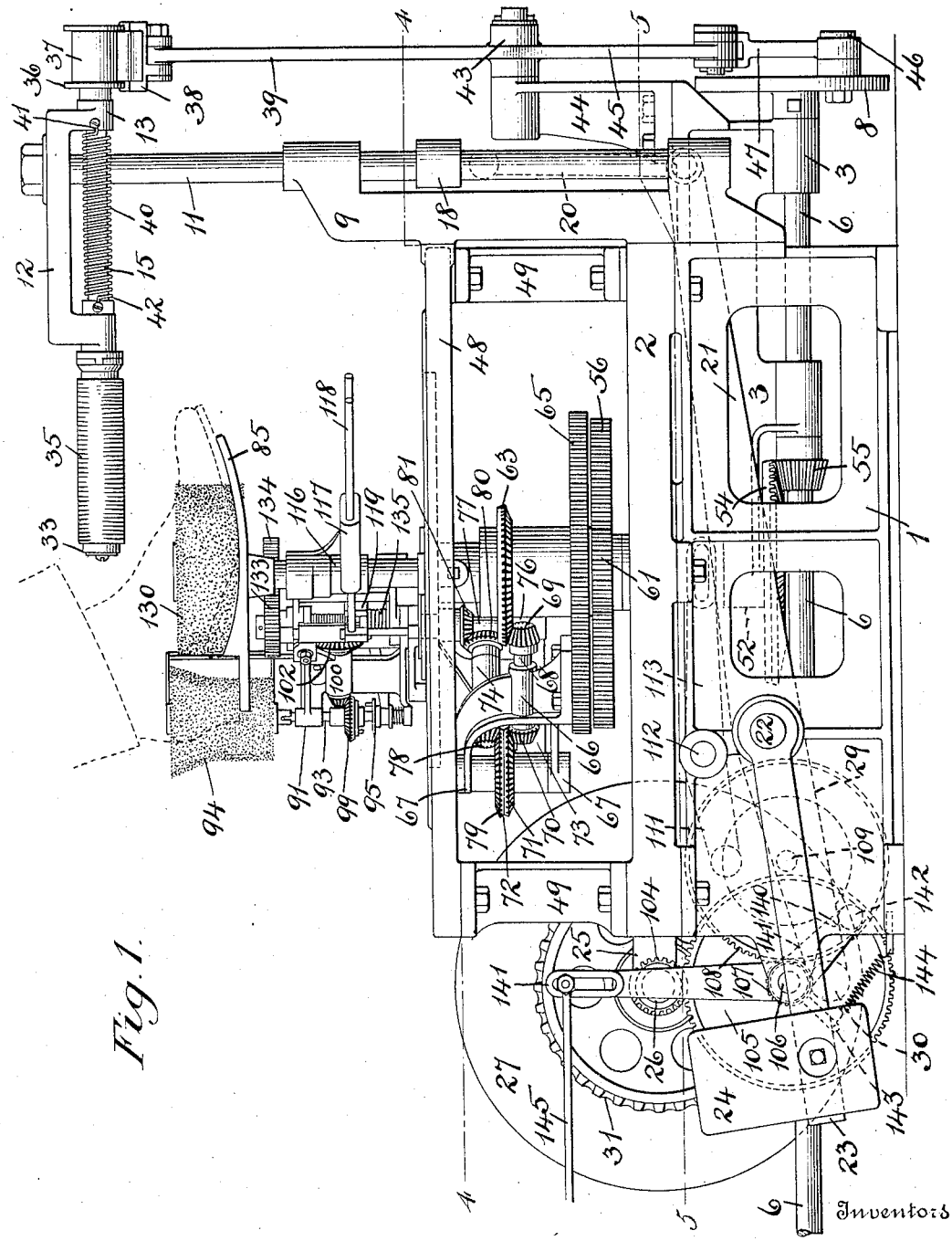

H. R. OLIVER & G. P. OHLGART.
MACHINE FOR POLISHING BOOTS AND SHOES.
APPLICATION FILED MAR. 24, 1910.

1,055,979.

Patented Mar. 11, 1913.
7 SHEETS—SHEET 1.

Witnesses
Edwin L. Bradford
G. Ferdinand Vogt.

Inventors
Herbert R. Oliver
George P. Ohlgart
By Mann & Co.
Attorneys

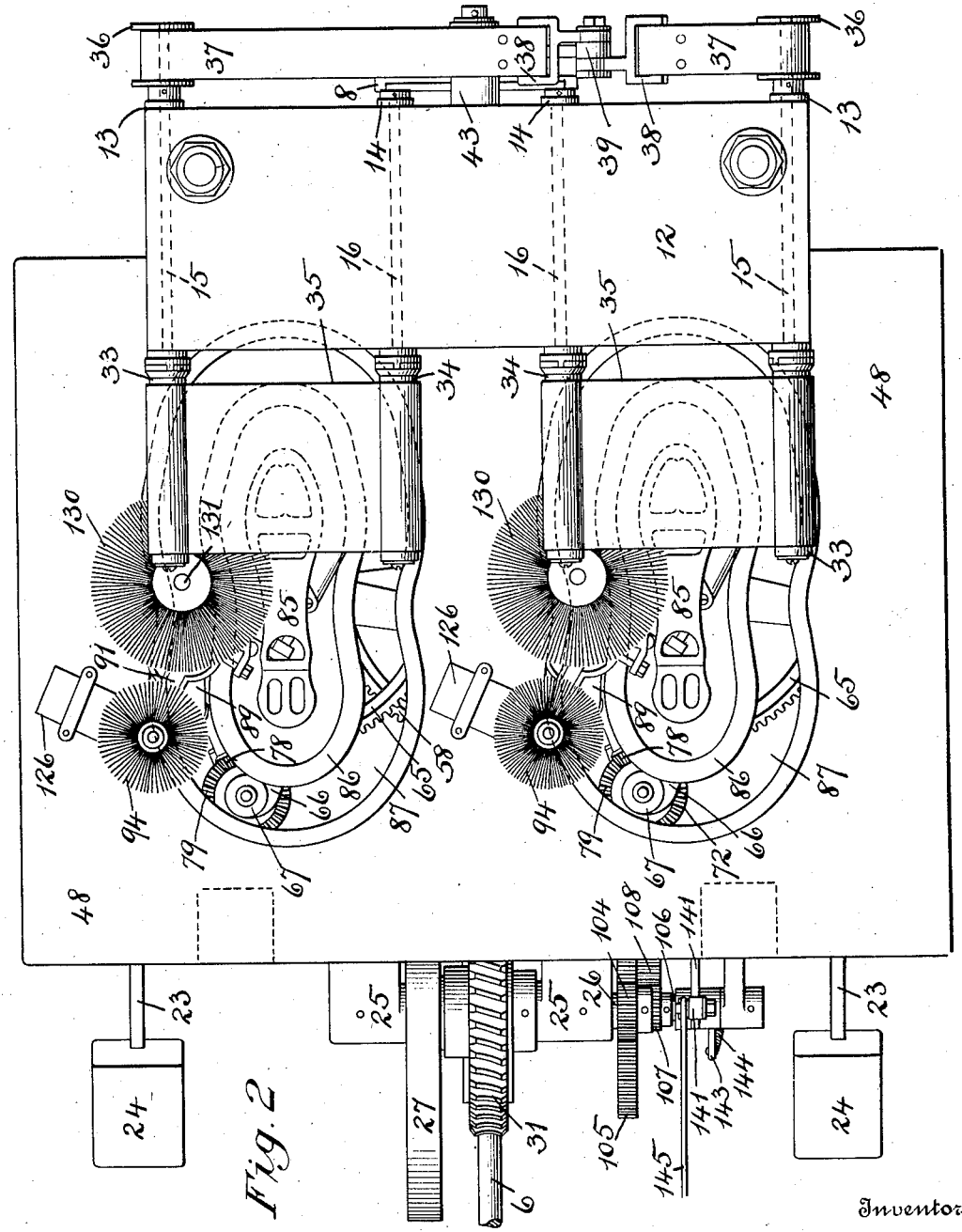

H. R. OLIVER & G. P. OHLGART.
MACHINE FOR POLISHING BOOTS AND SHOES.
APPLICATION FILED MAR. 24, 1910.
1,055,979.
Patented Mar. 11, 1913.
7 SHEETS—SHEET 3.
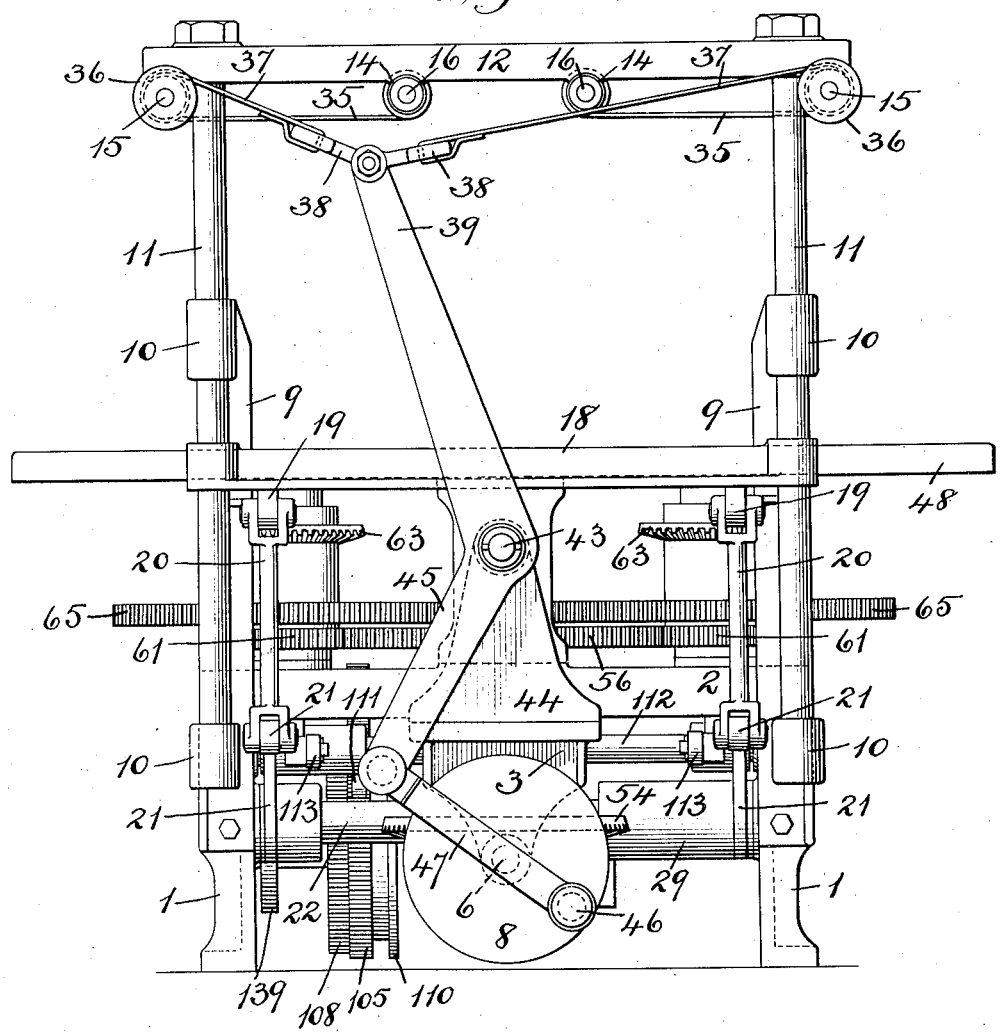
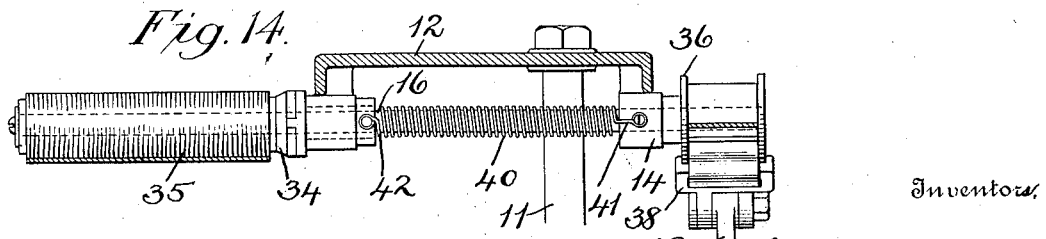

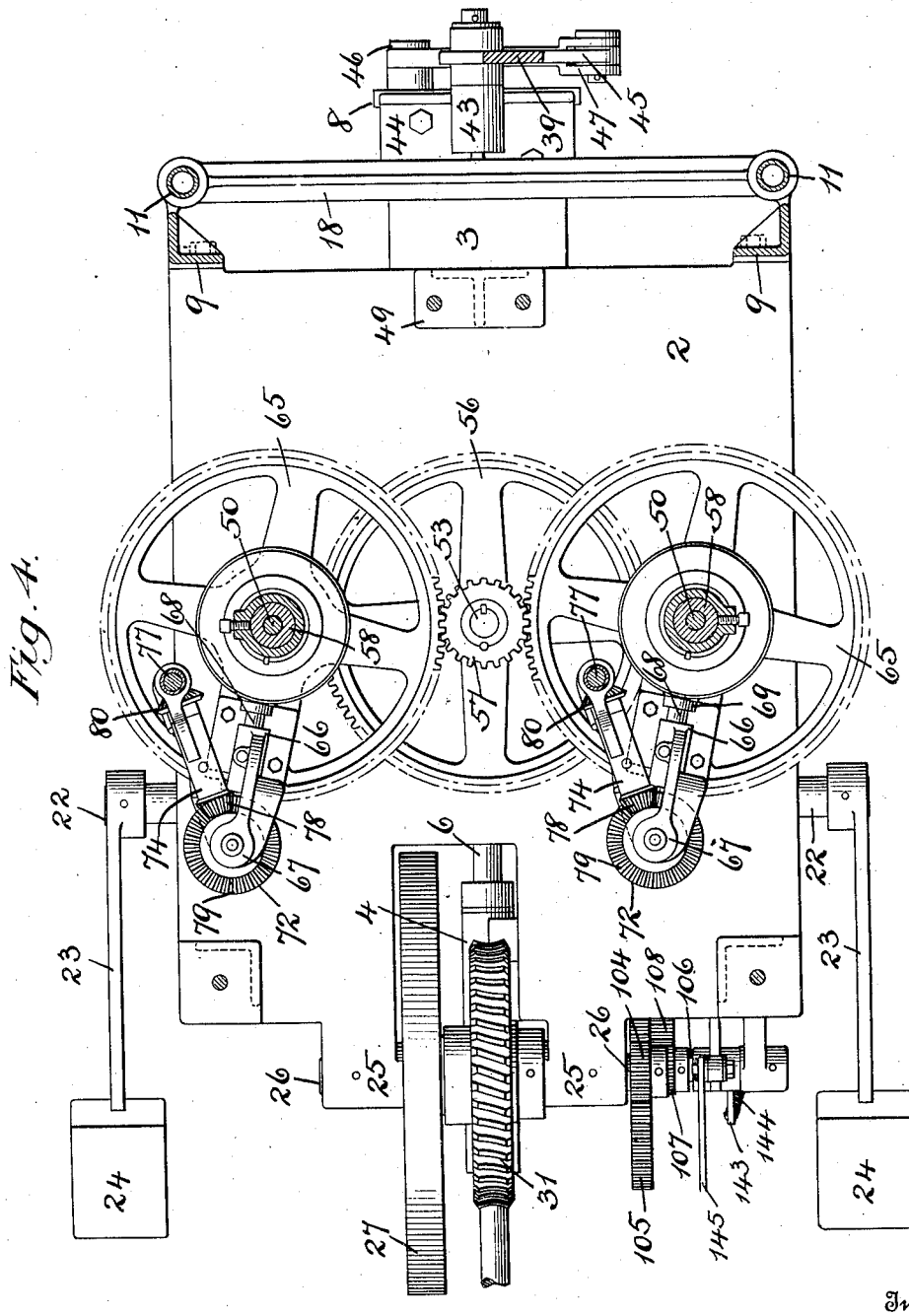

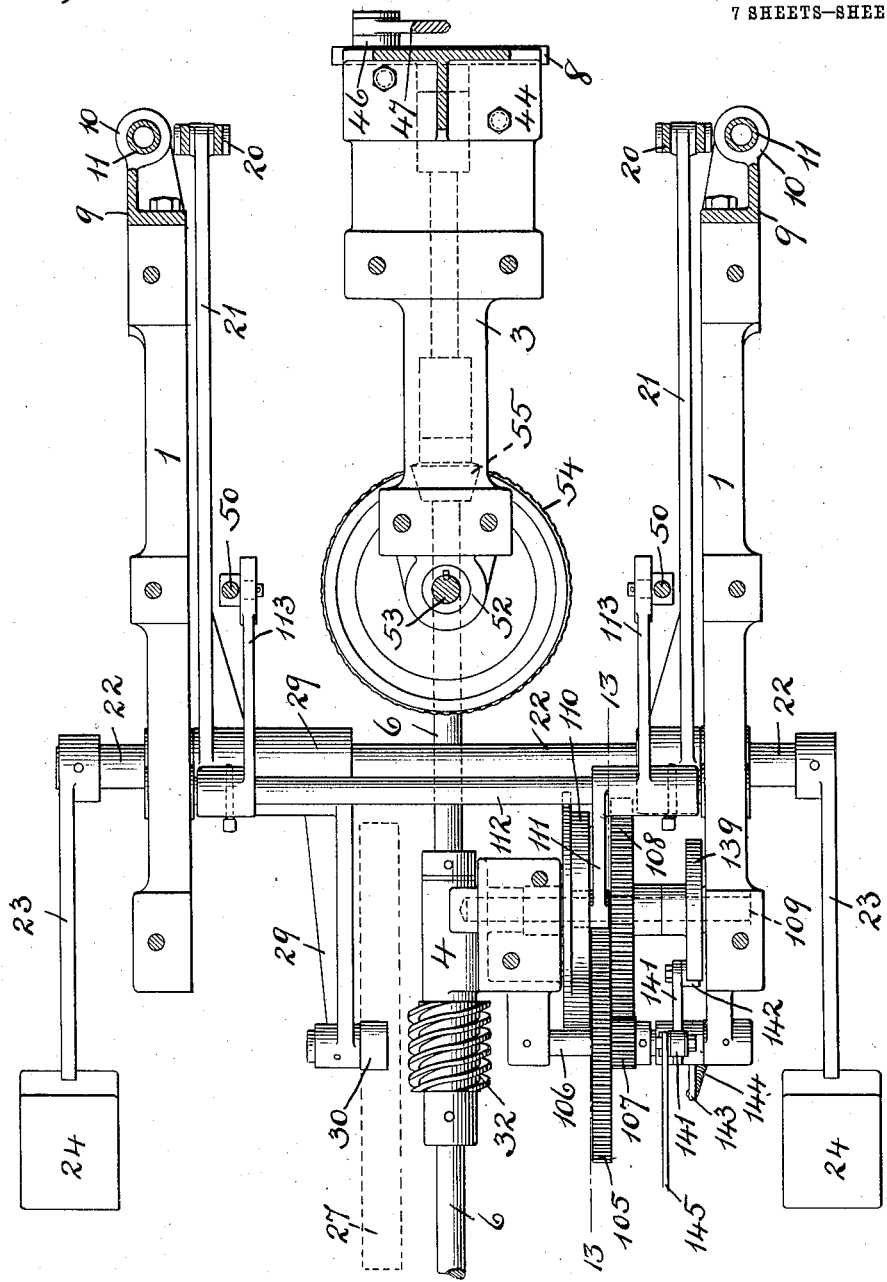

H. R. OLIVER & G. P. OHLGART.
MACHINE FOR POLISHING BOOTS AND SHOES.
APPLICATION FILED MAR. 24, 1910.
1,055,979.
Patented Mar. 11, 1913.
7 SHEETS—SHEET 6.
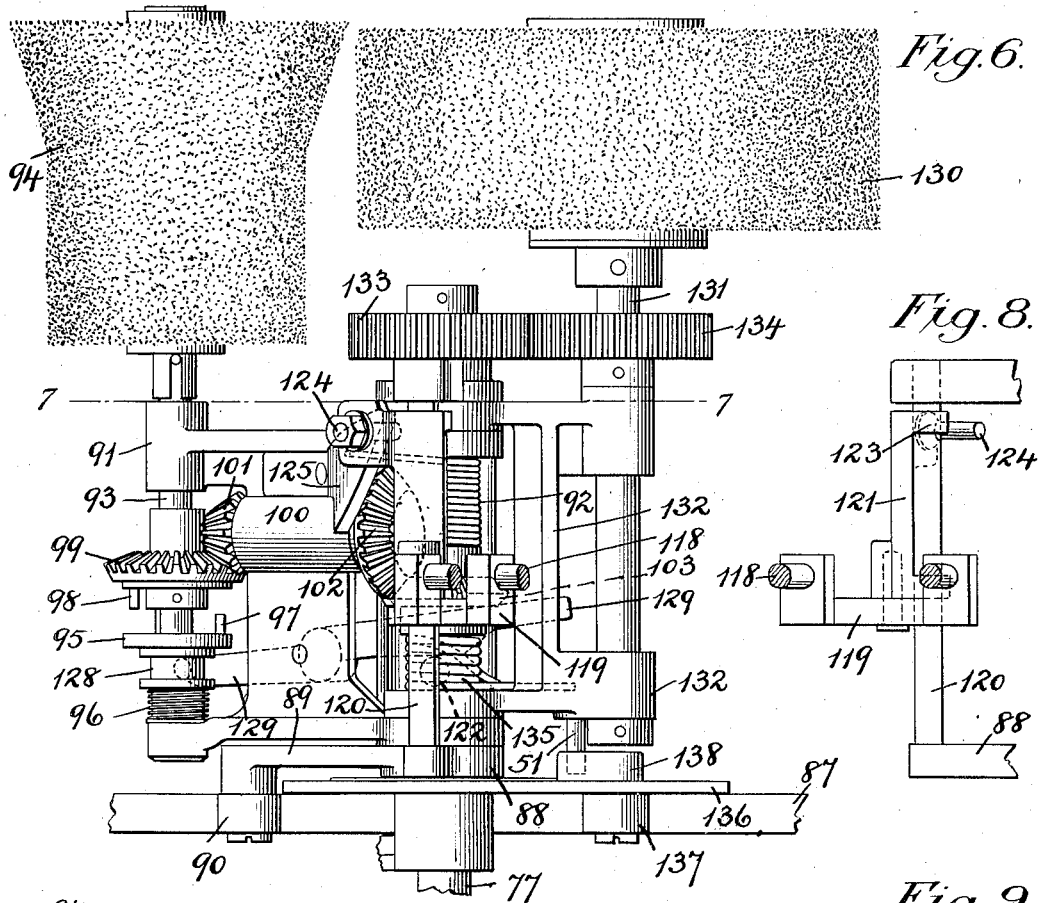
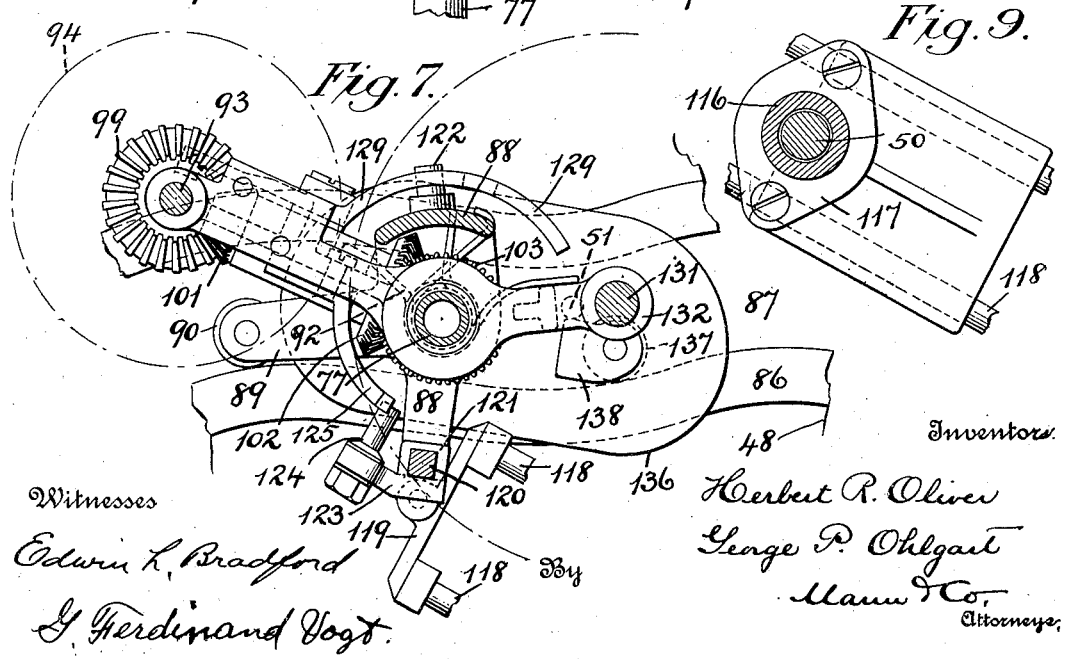

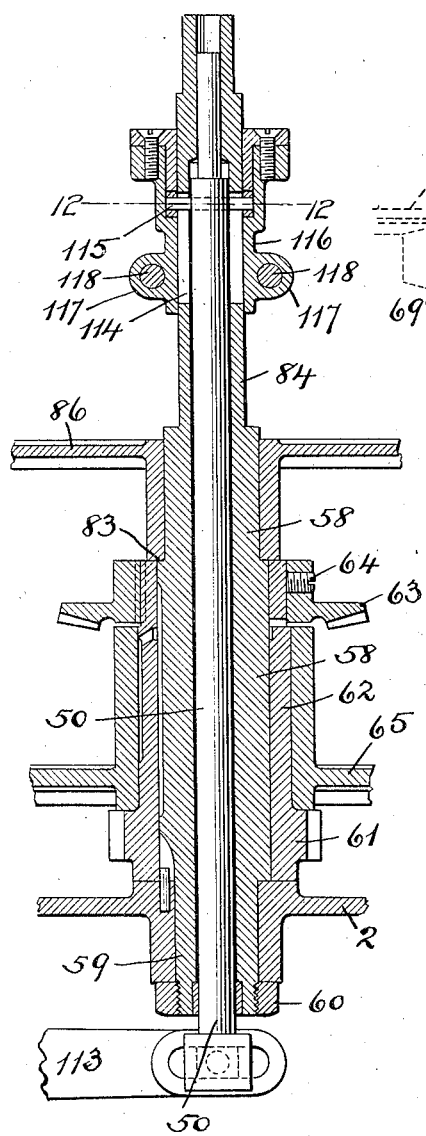
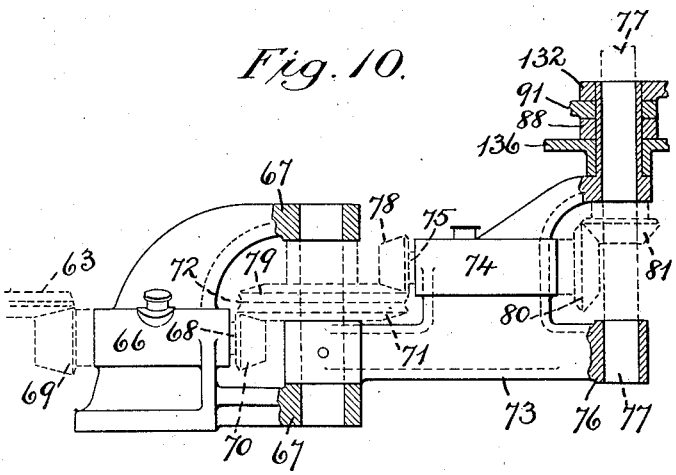
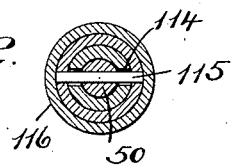
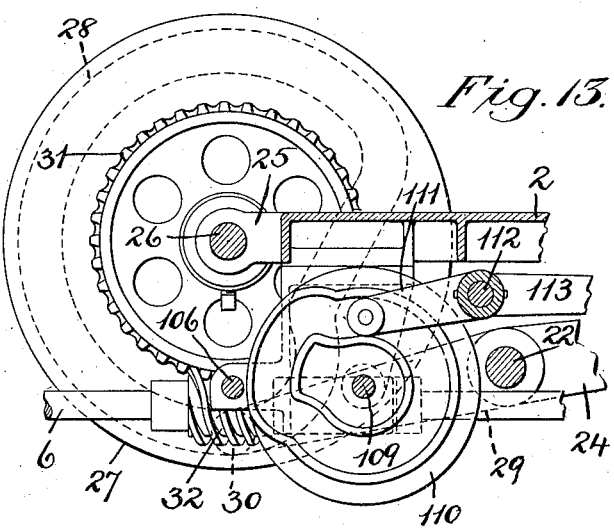

UNITED STATES PATENT OFFICE.

HERBERT R. OLIVER AND GEORGE P. OHLGART, OF BALTIMORE, MARYLAND, ASSIGNORS, BY DIRECT AND MESNE ASSIGNMENTS, TO THE AMERICAN AUTOMATIC SHOE POLISHING MACHINE CO., OF BALTIMORE, MARYLAND, A CORPORATION OF NEW JERSEY.

MACHINE FOR POLISHING BOOTS AND SHOES.

1,055,979.  Specification of Letters Patent.  Patented Mar. 11, 1913.

Application filed March 24, 1910. Serial No. 551,361.

*To all whom it may concern:*

Be it known that we, HERBERT R. OLIVER and GEORGE P. OHLGART, citizens of the United States, residing at Baltimore, in the State of Maryland, have invented certain new and useful Improvements in Machines for Polishing Boots and Shoes, of which the following is a specification.

This invention relates to machines for polishing boots or shoes and has particular reference to and is an improvement on the machine shown and described in Letters Patent No. 953,919 the application for which was filed by us on the thirteenth day of March nineteen hundred and eight in which a side-polishing device is employed to polish the side portions of a shoe and a toe-polisher is operated to polish the toe of the shoe.

The present invention has for its object to generally improve and simplify machines of this class both in construction and operation; to make them more rapid in effecting the polishing of the shoe and to provide such movements in accomplishing the result as will eliminate objectionable noise, jar and vibration to the parts and the resultant racking of the machine usually accompanying the same.

Another object of the invention is to combine a rotary side polishing device with an improved mechanism for polishing the toe of the shoe and to improve the mechanism for imparting such movements to the two polishers as will enable them to thoroughly clean and polish the shoe simultaneously without interfering with each other.

The invention is illustrated in the accompanying drawings, in which,—

Figure 1 shows a side elevation of the improved machine; Fig. 2 a top plan view of the same; Fig. 3 a front elevation thereof; Fig. 4 a horizontal sectional plan of the machine—the section being taken on the line 4—4 of Fig. 1; Fig. 5 is another sectional plan taken on the line 5—5 of Fig. 1 to show the driving mechanism; Figs. 6 and 7 show side elevations and sectional plan views respectively of the swinging side polisher and polish-applying brush and their immediate actuating mechanism; Fig. 8 is a detail elevation of the bracket structure that causes the polish-applying brush to swing laterally; Fig. 9 is a detail plan of the sleeve for sustaining the rods that cause the polish-applying brush to swing,—the section being taken on the line 9—9 of Fig. 11; Fig. 10 is a detail of the brackets and shafts carrying and driving the polisher brushes; Fig. 11 is a vertical section through one of the tubular supports and shows the positions thereon of the several gears for driving the polisher mechanisms; Fig. 12 is a cross-section through the same,—the section being taken on the line 12—12 of Fig. 11; Fig. 13 is a vertical longitudinal section taken on the line 13—13 of Fig. 5, showing the main driving mechanism, the cams and levers for moving the toe polisher devices vertically, and also the levers for effecting the movement of the side polishers against the shoes; Fig. 14 is a vertical section through the table at the front of the machine and a side elevation of one of the rolls and shaft carrying the same.

Referring to the drawings the numeral, 1, designates the vertical side frames which support a horizontal bed plate, 2. Suitable bracket bearings, 3, and, 4, are secured to the bottom side of the bed plate and hang pendently therefrom so as to sustain a main horizontal driving shaft, 6, which has a central position between the said two side frames. The inner end of this driving shaft may be driven in any suitable manner but preferably by an electric motor, not shown, while the outer end of said shaft carries a circular crank wheel, 8, which revolves in a vertical plane adjacent to the front edge of the bed plate.

Vertical brackets, 9, are provided at opposite corners of the bed plate adjacent the front edge thereof and have tubular sleeves, 10, at their upper and lower ends respectively. These two brackets, 9, have position at opposite sides of the central driving shaft, 6, and serve to sustain the toe polishing mechanisms as will presently be explained.

It should be understood that the machine shown in the accompanying drawings is provided with two complete sets of side and toe polishers and that both sets are operated and driven from the same central horizontal driving shaft. These two sets of polishing devices are therefore positioned at opposite sides of the main driving shaft so that both shoes may be operated upon and polished simultaneously. As both sets of polishing mechanisms have precisely the same construction and operation, like reference characters will be applied to each, and a separate and duplicate description of them will be unnecessary.

By reference to Figs. 1, 2 and 3 it will be seen that the tubular sleeves, 10, of the brackets, 9, sustain rods, 11, which extend vertically therein so as to have movement therethrough, and that the upper ends of said rods carry a plate or table, 12, which extends horizontally and across the front of the machine. This plate or table is provided on its bottom side with suitable bearings, 13, and, 14, which sustain horizontal toe-polisher shafts, 15, and, 16, respectively.

A bar, 18, extends horizontally between and connects the vertical rods, 11, as clearly seen in Fig. 3, and said bar and rods are movable vertically together. Suitable lugs, 19, are provided on the bar, 18, at opposite ends thereof, so that the upper ends of links, 20, may be pivotally connected thereto while the lower ends of the links are pivotally connected with the forward ends of levers, 21. These levers are sustained from a horizontal rock-shaft, 22, which has bearing in the vertical side frames, 1. It will thus be understood that the bar, 18, rods, 11, and plate or table, 12, are all sustained from the rock-shaft, 22, by the levers, 21, and that as the shaft is rocked the plate or table will be raised or lowered as desired. In order to counterbalance the weight of the rods and table at the forward end of the levers, 21, the ends of the rock-shaft are provided with rearwardly-extending bars, 23, each having a weight, 24, at its rear end.

By reference to Figs. 1, 2, 4 and 13 it will be seen that the bed plate, 2, carries spaced-apart horizontal bracket bearings, 25, at its rear end and that a horizontal shaft, 26, is sustained in said bearings. This shaft carries a large cam, 27, which is provided with a groove, 28, (see broken lines in Fig. 13) and the rock-shaft, 22, carries a bracket arm, 29, that extends rearwardly at the grooved side of the cam and has a roller, 30, that travels in said cam groove, as indicated in Fig. 5. By means of this grooved cam and bracket arm, the shaft, 22, is rocked and the plate or table, 12, raised or lowered. The shaft, 26, carries a worm gear, 31, which is driven by a worm, 32, on the main driving shaft, 6.

By reference to Figs. 1 and 2 it will be noted that the table, 12, sustains the horizontal shafts, 15, and, 16, which carry rolls, 33, and, 34, and that a flexible band or fabric strip, 35, has one end wound on one of said rolls and its other end wound on the other roll.

Each shaft, 15, carries a pulley or reel, 36, each of which has one end of a band, 37, attached to and wound about it, while the other ends of said bands are connected to swiveled clips, 38, which are carried on the upper end of a vertical rock bar or lever, 39, as will presently be more fully described. It will therefore be seen that if bar or lever, 39, is swung in one direction one fabric strip, 35, will be wound upon roll, 34, on one shaft, 16, while at the same time the other fabric strip, 35, will be unwound from the roll, 34, of the other shaft, 16, but the movement of said lever or bar at all times causes both fabric strips, 35, to travel horizontally from one roll onto the other. To effect this winding and unwinding of the fabric strips, 35, and the travel of the same horizontally back and forth between the rolls, 33, and, 34, we provide the shafts, 15, and, 16, with coiled springs, 40, which encircle the shafts and have one end, 41, rigidly attached to a stationary point, such as the bearings, 13, and, 14, as seen in Fig. 14, while the opposite end, 42, of each spring is made fast to the revolving shaft or the roll that revolves with the shaft and on which the end of the fabric strip, 35, is wound. By this arrangement it will be seen that if shaft, 15, or, 16, is turned in one direction the coiled spring, 40, will be wound thereon and placed under tension so that when released it will cause the shaft to revolve in the other direction.

By reference to Figs. 1 and 3 it will be noted that rock bar or lever, 39, is pivotally sustained at, 43, to a suitable bracket, 44, at the front of the machine and in a central vertical plane over the horizontal shaft, 6, and that the lower end, 45, of said bar or lever extends to one side of said central vertical plane and at an angle with respect to the upper end thereof.

The crank wheel or plate, 8, at the forward end of the shaft, 6, is provided with a wrist pin, 46, and a link, 47, has one end engaging the crank pin and its other end pivotally connected to the lower end, 45, of the rock bar or lever, 39. By means of this arrangement the rotary motion of the crank wheel or plate, 8, is utilized to impart a reciprocating swinging movement to the upper end, 39, of the rock bar or lever and consequently the bands, 37, are alternately drawn from around the reels, 36, which effects a revolution of the shafts, 15, and a winding of the polisher strips, 35, onto the rolls, 33. When the lever, 39, moves in the opposite direction or toward said reels, 36, the springs, 40, will operate to wind the bands, 37, onto the reels and to also wind the polisher strips, 35, onto the rolls, 34, of shafts, 16. Thus at each stroke of the lever, 39, to the right the polisher strip, 35, will travel horizontally to the left while the movement of lever, 39, to the left will cause said strips, 35, to travel horizontally to the right.

From the foregoing description it is to be understood that while the polisher strips, 35, are being reciprocated horizontally they are also movable vertically with the table, 12, which table is intermittently raised and lowered with the vertical rods, 11, by the rocking of levers, 21; rock-shaft, 22, and lever-arm, 29, through the revolution of the cam, 27. The flexible bands, 37, readily permit the table to rise and lower with respect to rock bar or lever, 39, which drives the polisher strips.

It is to be understood that the machine illustrated in the accompanying drawings is designed to simultaneously operate on both shoes and effect a polishing of the sides, heels and toes in one operation, and to effect this, in addition to the toe-polishing mechanism heretofore described, there are provided two side polishing mechanisms,—one for each shoe. These side polishing mechanisms are alike in construction and in the present instance include brush devices that travel in a circuit and have an orbital movement about the shoes.

By reference to Figs. 1 and 5 of the drawings it will be noted that the bracket, 3, at the bottom of the machine, has at its inner end a vertical bearing, 52, which sustains a short vertical shaft, 53. A bevel gear, 54, is carried on the lower end of said short shaft and is driven by a bevel pinion, 55, on the main driving shaft, 6. Now by referring to Figs. 1, 3 and 4 it will be seen that the short shaft, 53, extends up through the bed plate, 2, and immediately above said plate carries a large gear, 56, and also a pinion, 57, on top or above the said gear. It will also be seen that said gear, 56, and pinion, 57, have substantially a central position with respect to the bed plate, 2.

The two side polishing mechanisms are sustained from the bed plate, 2, at opposite sides of the central gear, 56, and a sectional detail of the vertical support for the same is illustrated in Fig. 11 of the drawings to which attention is directed.

At the side of the central gear, 56, the bed plate, 2, sustains a vertical tubular support, 58, which has a lower reduced threaded end, 59, that projects through an opening in the base plate and is held in a rigid vertical position by means of a nut, 60, on the lower end thereof. A pinion, 61, is mounted on the tubular support adjacent and immediately above the base plate, 2, and meshes with the central gear, 56, which latter drives it in a horizontal plane. This pinion has a sleeve portion, 62, which projects vertically on and around the rigid tubular support and the upper end of said sleeve carries a horizontal bevel gear, 63, which is rigid with respect to and revolves with the sleeeve and the pinion, 61; a set screw, 64, serves to secure the two together. The pinion, 61, and bevel gear, 63, revolve at a comparatively high rate of speed while in a horizontal plane between the two and mounted loosely on the sleeve, 62, there is provided a horizontal gear, 65, as shown in Figs. 1, 3, 4 and 11. This gear, 65, overlaps the large gear, 56, and meshes with and is driven by the pinion, 57, on the central vertical shaft, 53, so that said gear is revolved at a comparatively low rate of speed.

By reference to Figs. 1 and 4 it will be noted that the horizontal gear, 65, is provided on its upper side with a bracket bearing, 66, which is rigidly secured thereto, and the outer end of which is provided with vertically spaced-apart bearings, 67. A horizontal shaft, 68, is mounted in the bearings, 66, and is provided with a beveled pinion, 69, that meshes with and is driven by the beveled gear, 63, on the tubular support. The outer end of the shaft, 68, is also provided with a pinion, 70, which meshes with the lower teeth, 71, of a double-faced gear, 72, carried in the vertical bearing, 67.

An arm or bracket, 73, is mounted between the bearings, 67, and below the gear, 72, and is capable of swinging with respect thereto and said arm carries a horizontal bearing, 74, in which a horizontal shaft, 75, is mounted, see Fig. 10. The outer end of the bearing, 74, is provided with a step-like bearing, 76, in which a vertical shaft, 77, is mounted. The horizontal shaft, 75, is provided at one end with a pinion, 78, that meshes with upper teeth, 79, on the double faced gear, 72, and the opposite end of said shaft carries another pinion, 80, which meshes with and drives a bevel gear, 81, on the vertical shaft, 77.

From the foregoing description it is to be understood that the horizontal shaft, 75, the vertical shaft, 77, and the driving mechanism connecting them are all mounted or sustained indirectly by and move with large horizontal gear, 65, so as to travel about the tubular support, 58, and that the bearing, 74, and said shafts, 75, and, 77, have a swinging movement independently of the said gear, 65 while traveling in a circular direction therewith. The reason for this, is, that the vertical shaft, 77, carries the side polishing devices, and the latter must follow the contour of the foot or shoe, consequently the shaft that carries these devices must be movable laterally while maintained in a vertical position to enable the polishing and paste applying brushes to keep close against the side of the shoe during their respective operations.

Above the bearing, 74, the machine is provided with a horizontal plate or table, 48, sunstained by suitable supports, 49, which project vertically from the bed-plate, 2, hereinbefore referred to. The tubular support, 58, also has a shoulder, 83, which forms central supports for a purpose presently to be described, while a tubular extension, 84, projects above the table and at its upper end sustains a foot or shoe support, 85.

The table, 48, is cut out around the tubular supports, 58, and has a cam plate, 86, which is seated upon the shoulder, 83, and is rigid with the support, 58. This cam plate is flush with the top surface of the table and has position in the cut out portion thereof so as to form a cam slot, 87, between the edges of the cut out in the table and the cam plate, as clearly shown in Figs. 2 and 7. The shape of this cam slot, 87, resembles the outline of the bottom of the shoe and shoe-support, 85, and serves as a guide to direct the polish-applying and polishing brushes as they travel in a circuit about the shoe as will presently be described. The vertical shaft, 77, heretofore described projects up through the cam slot and its projecting end carries a yoke frame, 88, see Figs. 6 and 7.

At the lower end the yoke frame is provided with a horizontally-projecting arm, 89, which trails behind it and which carries a roller, 90, on its under side that travels in the cam slot and thereby serves to direct the yoke frame as it travels in a circuit about the shoe.

A swinging bracket frame, 91, carries the polish-applying mechanism and is mounted on and projects horizontally from the vertical shaft, 77, between the upper and lower horizontal portions of the yoke frame, and this swinging bracket also trails behind said shaft, 77, during their travel in a circuit about the shoe.

A spring, 92, is coiled about the shaft, 77, and has one end attached to the swinging polisher bracket and the action of this spring is to constantly draw the bracket toward the cam-plate, 86, and also toward the shoe-support, 85, so that unless held away, this bracket would move inwardly to a position at the side of the shoe and support where polish would be applied to the shoe. The fact is, in actual practice, this polisher bracket during the entire polishing operation makes twenty circuits more or less around the shoe, but during only the second, third, fourth and fifth circuits it is permitted to swing inwardly against the shoe to the polish-applying position. The devices for causing this swinging movement will presently be described.

The swinging polisher bracket, 91, carries a vertical shaft, 93, the upper end of which is provided with a polish-applying brush, 94. This brush revolves only while it makes its four circuits around and in contact with the shoe, and during its travel for the remaining sixteen circuits more or less, it is idle. The lower end of the shaft, 93, carries a clutch member, 95, which has a vertical movement on the shaft, but is prevented from turning independently thereof. A coiled spring, 96, beneath the clutch member exerts a constant upward pressure thereon and tends to move said member upwardly so that the pins, 97, on its upper surface may engage pins, 98, on the bottom of the constantly revolving horizontal gear, 99, which normally revolves freely on said shaft, 93.

A horizontal shaft is carried in a horizontal bearing, 100, by the swinging bracket, 91, and the outer end of this shaft is provided with a pinion, 101, which meshes with and drives the gear, 99, while the inner end of said shaft carries a beveled gear, 102, which is driven by a horizontal pinion, 103, on the vertical shaft, 77. As the vertical shaft, 77, is constantly revolved, the pinion, 103, gear, 102, and, 101, and the normally loose gear, 99, on the shaft, 93, will also be constantly revolved.

The device employed for swinging the polisher bracket, 91, and the mechanism carried thereby, from the operative to the inoperative position will now be described; reference being made to Figs. 1, 2, 5 and 13.

The horizontal shaft, 26, at the rear of bed plate, 2, carries a pinion, 104 which drives a gear, 105, on a horizontal shaft, 106, at the rear of the side frames, 1. A pinion, 107, is also carried on the shaft, 106, at the outer side of the gear, 105, and said pinion drives a gear, 108, that is carried on another horizontal shaft, 109, in front of it. The shaft, 109, carries a cam, 110, with a groove in the outer side thereof so that an arm, 111, that is mounted on a horizontal rock shaft, 112, may have its free end projecting in said cam groove and be raised and lowered to rock the shaft, 112, as the cam revolves. Lever or rock arms, 113, are carried on the shaft, 112, one arm being provided for each polisher mechanism, and each arm projects forwardly so that its free end will have position directly beneath the tubular support, 58, as clearly seen in Fig. 11.

A vertical rod, 50, extends through the tubular support and the lower end of this rod is pivotally connected to the forward end of the lever or rock arm, 113, see Fig. 11, so that when the arm, 111, is depressed by the cam, 110, the forward end of rock arm, 113, will be raised and the vertical rod, 50, elevated, and vice versa. The vertical rod, 50, in Fig. 11 is shown in the normal raised position which it has when the polish-applying brush, 94, is held away from the shoe.

The upper end of the vertical rod, 50, even when said rod is depressed, has position in a plane above the cam-plate, 86, that guides the polishing devices in their circuit about the shoe, and said rod-end is movable in the tubular extension, 84, of the support, 58. This tubular extension is provided with vertical slots, 114, at diametrically opposite sides through which the ends of a horizontal pin, 115, extend after having been passed through the rod.

A sleeve, 116, surrounds said tubular extension, 84, of the support, 58, and engages the projecting ends of the pin, 115, and said sleeve is provided with tubular horizontal side supports or brackets, 117, which sustain reciprocable horizontal rods, 118. These rods are loose in the side supports or brackets and may move longitudinally therein while the rods and sleeve may both turn freely on the support, 84. The forward projecting ends of the rods, 118, are rigidly attached to a cross-bar, 119, see Figs. 1, 6, 7 and 8, which holds the rods rigidly together, and which has position in a horizontal plane between the upper and lower arms of the yoke frame, 88. By reference to said Figs. 7, 8 and 9 it will be seen that the yoke frame, 88, carries a vertical rod, 120, and that a bracket, 121, embraces the said rod and pivotally connects the cross bar, 119, so that when the vertical rod, 50, is raised or lowered, the horizontal rods, 118, cross-bar, 119, and bracket, 121, may also be raised or lowered. It is this vertical movement of the cross bar and bracket that causes the frame, 91, and the polish-applying brush, 94, to swing toward or away from the shoe. The vertically movable bracket, 121, is provided with an arm, 123, which carries a lug or pin, 124, at one side and a cam plate, 125, is mounted at the side of the swinging bracket frame, 91, which curves around and projects over said lug or pin as shown in Figs. 6 and 7. It is to be understood therefore, that when the bracket, 121, is raised, the pin, 124, will contact with the inclined surface of the cam plate, 125, and cause said plate to move laterally or swing away from the bracket, and as said plate is rigid on the swinging bracket frame, 91, the latter and all the polish-applying devices carried by it, including the shaft, 93, and brush, 94, will be swung away from the bracket, 121, and thus throw the polish-applying brush out of contact with the shoe. This movement is made against the action of the coiled spring, 92, and this condition will prevail so long as the vertical rod, 50, is held up or elevated by the cam, 110, which in the present instance is during about sixteen revolutions or circuits more or less, of the polisher mechanism about the shoe. While the polish-applying brush, 94, is held away from the shoe it is desirable to stop its revolution so that it will not collect the paste from the paste receptacle, 126, when not in actual use.

The paste receptacle, 126, is mounted on an arm that is carried by the bracket frame, 91, so that it may move with the latter toward and from the shoe. This receptacle is substantially like the one shown and described in our Patent 953,919 hereinbefore referred to, and a detailed description of the same is therefor deemed unnecessary, it being sufficient to state that it has a concave open side that fits closely about the brush, 94, so that the latter in revolving will collect the paste and apply it to the shoe.

In order to stop the revolution of the polish-applying shaft, 93, a clutch member, 95, is provided with a circumferential groove, 128, and to the side of the bracket, 91, there is pivotally mounted a lever, 129, one end of which projects into the groove, 128, of the clutch member. The other end of the lever, 129, inclines upwardly and projects over a pin, 122, on the side of the frame, 88, so that when said bracket, 91, swings outwardly the inclined surface of the lever 129 will be correspondingly operated to lower the clutch member. When the bracket is raised as in Fig. 6, the operating end of the lever, 129, will be lowered and thus the clutch member will be depressed from engagement with the pins, 98, on the continuously-revolving loose gear, 99, and the shaft, 93, will become idle.

The polisher brush, 130, is mounted on a vertical shaft, 131, which is carried in a swinging bracket, 132. This bracket is pivotally mounted on the vertical shaft, 77, and a gear, 133, on the upper end of said shaft meshes with a gear, 134, on the polisher shaft, 131, and drives the latter. A coiled spring, 135, around the shaft, 77, serves to press the swinging bracket, 132, and the polisher brush inwardly toward the shoe support so as to provide a yielding contact between the brush and the shoe under treatment.

A plate, 136, is carried on the shaft, 77, and has a roller, 137, at its outer and under side which travels in the cam slot, 87, and the upper side of said plate is provided with a vertically-projecting lug or stop, 138, against which a downwardly extending lug, 51, on bracket, 132, will contact to limit the movement of said bracket in a direction toward the shoe.

In practice the machine is operated by an electric motor and after the brushes have made the requisite number of circuits around the shoe the motor is cut out and the machine stopped. While this particular mechanism forms no part of the present application a portion of it is shown in Figs. 1 and 5 and will be briefly referred to.

The outer end of horizontal shaft, 109, carries a cam, 139, having a single lug, 140, on its circumference and a lever, 141, is pivotally sustained on horizontal shaft, 106, and carries a roller, 142, at its lower end which rides against the face of the cam, 139. An arm, 143, on the lever is drawn downwardly by a spring, 144, which keeps the roller against the cam and a switch rod, 130

145, is connected to the upper end of lever, 141. This switch rod operates a suitable switch (not shown) but which controls the current to the motor also not shown. The shaft, 109, and cam, 139, revolve slowly during the polishing operation and when the lug, 140, on the cam reaches the roller, 142, on the lever, the latter will be shifted slightly and the rod, 145, will operate the switch to cut off the current.

The operation of the machine is substantially the same as described in our pending application hereinbefore referred to in that the polisher brush, 130, makes one or more orbital movements or circuits around and in contact with the shoe to brush off the dust; the polish-applying brush being held away from the shoe during the first circuit. The polish-applying brush then swings into contact with the shoe behind the polisher and both brushes then make a plurality, or to be more exact, four orbital movements about the shoe. The polish-applying brush then swings away from the shoe and the polishing brush continues its circuits until the operation is complete. During the orbital movements of the side polishing brushes about the shoe the toe polisher is also operating, but as the side polishers reach the toe the cam, 27, which makes one revolution for each circuit made by the side polishers, will cause the table, 12, and the toe polishers to be elevated long enough to permit the side polishers to pass beneath the latter and then drop again to continue its toe polishing operation.

The reciprocating back-and-forth movements of the toe polishing strips are very desirable in the polishing of a shoe, for the reason that such movements enables a cloth to be used which is perhaps the best known polishing medium, and it causes a rubbing of the leather in both directions which produces a polish that can only be equaled by hand.

Having thus described our invention what we claim and desire to secure by Letters Patent is,—

1. In a shoe polishing machine the combination with two shoe supports, of polishers to polish the sides and ends of the shoes and one of said polishers being provided for each shoe support; two toe-polishing fabrics,—one for each shoe to be polished and said fabric being sustained adjacent to the toe-ends of said shoe supports; a rotatable shaft for each end of each polisher; two flexible bands one band having one end connected with one rotatable shaft that sustains the end of one toe-polishing fabric and the other flexible band having one end connected to one of the rotatable shafts which sustain the other toe-polishing fabric; an oscillating lever attached to the other ends of said two flexible bands and means for moving the lever between the two shafts to which the two flexible bands are attached whereby to move the said flexible bands lengthwise to rotate said shafts and move both toe-polishing fabrics.

2. In a shoe polishing machine the combination with a shoe support, of a polisher to operate at the sides of the shoe support; two shafts extending horizontally and one at each side of the shoe support; a polishing fabric having one end wound on one of said shafts and its other end wound on the other of said shafts; spring means for yieldingly holding one of said two shafts with the polishing fabric wound thereon; a flexible band having one end wound about the other of said two shafts; a pivoted lever having one end connected to the other end of the said flexible band and means engaging the other end of said lever whereby to oscillate the same and reciprocate the polishing fabric between the two shafts.

3. In a shoe polishing machine the combination with a side polisher to operate on the side of the shoe, of a reciprocable toe polishing fabric; spring means for moving the toe-polishing fabric in one direction; a flexible band for operating the toe polishing fabric in a reverse direction; a lever having one end attached to the flexible band; a link attached to the other end of the lever and a crank connected with the link to oscillate the lever.

4. In a shoe-polishing machine the combination with the shoe supports, of side polishers to operate at the sides of the supports; a table extending horizontally adjacent the toe-ends of the supports; a plurality of horizontal shafts carried by said table and extending at opposite sides of each shoe support; a polisher fabric sustained by adjacent shafts; a plurality of reciprocating bands each having one end engaging a polisher shaft; a rock lever engaging the other ends of each band; a crank; means connecting the crank with the rock lever and means for moving the table vertically.

In testimony whereof we affix our signatures in presence of two witnesses.

HERBERT R. OLIVER.
GEORGE P. OHLGART.

Witnesses:
ALFRED G. GOODRICH,
CHARLES B. MANN, Jr.